US012163438B2

(12) United States Patent
Lee et al.

(10) Patent No.: US 12,163,438 B2
(45) Date of Patent: Dec. 10, 2024

(54) DETECTION OF GAS TURBINE ENGINE BLADE ABNORMALITIES BASED ON LIGHT REFLECTIONS

(71) Applicant: Raytheon Technologies Corporation, Farmington, CT (US)

(72) Inventors: Jeremiah C. Lee, Coventry, CT (US); Daniel McMenamin, Ellington, CT (US); Janet Shaw, Tolland, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/886,108

(22) Filed: Aug. 11, 2022

(65) Prior Publication Data

US 2024/0052757 A1 Feb. 15, 2024

(51) Int. Cl.
*F01D 21/00* (2006.01)

(52) U.S. Cl.
CPC ........ *F01D 21/003* (2013.01); *F05D 2260/80* (2013.01); *F05D 2270/304* (2013.01); *F05D 2270/709* (2013.01); *F05D 2270/804* (2013.01)

(58) Field of Classification Search
CPC .... F01D 21/003; F01D 5/005; F05D 2260/80; F05D 2260/81; F05D 2260/83; F05D 2270/304; F05D 2270/709; F05D 2270/804; G01S 7/00
See application file for complete search history.

(56) References Cited

U.S. PATENT DOCUMENTS 4,203,652 A * 5/1980 Hanada .............. G02B 19/0014 372/101
4,318,594 A * 3/1982 Hanada .............. G02B 19/0014 359/710
5,095,386 A * 3/1992 Scheibengraber .............. G02B 27/0911 359/710
5,606,410 A * 2/1997 Peclier .................. G01N 21/88 356/392

(Continued)

FOREIGN PATENT DOCUMENTS

CN 1835101 A * 9/2006 ......... G02B 27/0955
CN 104697469 A * 6/2015

(Continued)

OTHER PUBLICATIONS

Chu et al., Applications of digital-image-correlation techniques to experimental mechanics, 232-244, Sep. 1985 (Year: 1985).*

(Continued)

*Primary Examiner* — David E Sosnowski
*Assistant Examiner* — Wayne A Lambert
(74) *Attorney, Agent, or Firm* — Carlson, Gaskey & Olds, P.C.

(57) ABSTRACT

A method of inspecting blades of a gas turbine engine for abnormalities includes projecting light from a light source into an illumination area; utilizing a sensor to record data of at least one reflection of the projected light from a blade that is part of a gas turbine engine and is disposed in the illumination area; determining, based on the recorded data, whether the blade is abnormal; and based on the determining (Continued)

indicating that the blade is abnormal, providing a blade abnormality notification. A gas turbine engine is also disclosed.

28 Claims, 11 Drawing Sheets

(56) References Cited

U.S. PATENT DOCUMENTS

| | | | | |
|---|---|---|---|---|
| 5,963,328 | A * | 10/1999 | Yoshida | G01N 21/8806 356/600 |
| 6,526,089 | B1 * | 2/2003 | Haeno | G02B 27/09 372/98 |
| 6,693,293 | B2 * | 2/2004 | Oomori | G01N 21/55 250/559.4 |
| 6,842,293 | B1 * | 1/2005 | Yin | G02B 27/30 359/641 |
| 7,719,687 | B2 * | 5/2010 | Matsumoto | G01N 21/57 356/630 |
| 8,441,647 | B2 * | 5/2013 | Park | G01N 21/88 356/237.1 |
| 8,528,317 | B2 * | 9/2013 | Gerez | G07C 5/0891 60/39.092 |
| 9,267,378 | B2 | 2/2016 | Delvaux | |
| 9,926,937 | B2 | 3/2018 | Tourin et al. | |
| 10,914,191 | B2 * | 2/2021 | Finn | G06T 1/0014 |
| 11,268,881 | B2 | 3/2022 | Finn et al. | |
| 2003/0112447 | A1 * | 6/2003 | Harding | G01N 21/8806 356/603 |
| 2005/0270519 | A1 | 12/2005 | Twerdochlib | |
| 2006/0078193 | A1 | 4/2006 | Brummel et al. | |
| 2006/0086912 | A1 * | 4/2006 | Weir | G01N 25/72 250/559.4 |
| 2008/0111074 | A1 * | 5/2008 | Weir | G01N 21/8422 250/338.1 |
| 2012/0293647 | A1 * | 11/2012 | Singh | G01K 11/20 29/829 |
| 2013/0113916 | A1 * | 5/2013 | Scheid | G06T 7/0004 348/E7.085 |
| 2013/0194567 | A1 * | 8/2013 | Wan | G01B 11/167 356/152.1 |
| 2013/0202192 | A1 * | 8/2013 | Telfer | F01D 5/00 382/218 |
| 2014/0022357 | A1 * | 1/2014 | Yu | G01B 11/2545 348/47 |
| 2014/0291480 | A1 * | 10/2014 | Bruder | G01S 17/89 250/206 |
| 2015/0168263 | A1 * | 6/2015 | Mueller | F01D 21/003 348/82 |
| 2017/0138723 | A1 * | 5/2017 | Hovis | G01B 11/167 |
| 2018/0002039 | A1 * | 1/2018 | Finn | G06Q 10/20 |
| 2018/0210064 | A1 * | 7/2018 | Send | G01S 11/12 |
| 2019/0383161 | A1 * | 12/2019 | Graham | G01N 29/225 |
| 2020/0081121 | A1 * | 3/2020 | Singhal | G01S 7/4806 |
| 2021/0149023 | A1 * | 5/2021 | Ohta | G01S 7/4815 |
| 2021/0389229 | A1 * | 12/2021 | Wu | G02B 27/30 |

FOREIGN PATENT DOCUMENTS

| | | | | |
|---|---|---|---|---|
| CN | 107035432 | | 8/2017 | |
| CN | 109791203 | A * | 5/2019 | G01S 17/10 |
| CN | 112698513 | A * | 4/2021 | G02B 27/10 |
| CN | 116609950 | A * | 8/2023 | |
| EP | 2925972 | | 1/2019 | |
| EP | 2925972 | B1 * | 1/2019 | F01D 21/003 |
| FR | 3070965 | | 3/2019 | |
| JP | 2004245834 | A * | 9/2004 | G01N 29/043 |
| KR | 20170051110 | A * | 5/2017 | |
| KR | 101939564 | B1 * | 1/2019 | |
| TW | 202119058 | A * | 5/2021 | |
| WO | WO-2019219970 | A1 * | 11/2019 | G01S 17/10 |

OTHER PUBLICATIONS

Liu et al. CN 104697469 Espacenet—English Machine Translation, abstract, description (Year: 2015).*

Optics and Optical Coatings, Lens Selection Guide, website, wayback machine (Year: 2021).*

Yang et al., Progress and trends in nondestructive testing and evaluation for wind turbine composite blade, Renewable and Sustainable Energy Reviews 60 (2016) 1225-1250, (Year: 2016).*

Sun et al. CN 1835101, English machine translation, Espacenet—Bibliographic data, description, drawings (Year: 2006).*

European Search Report for European Patent Application No. 23189597.0 dated Jan. 8, 2024.

* cited by examiner

DETECTION OF GAS TURBINE ENGINE BLADE ABNORMALITIES BASED ON LIGHT REFLECTIONS

BACKGROUND

This application relates to detecting abnormalities in blades of a gas turbine engine, and more particularly to detecting abnormalities in the blades based on reflections of light projected onto the blades.

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

It is known to manually inspect blades of a gas turbine engine, such as fan blades, for wear to determine if the blades should be replaced or serviced. However such inspections can typically only happen when a gas turbine engine is not operating and sometimes, the engine has been removed from the aircraft.

Inlet debris monitoring systems are known that can detect debris entering a gas turbine engine during engine operation, but they can only detect debris that enters the engine and they do not detect abnormalities, such as damage, on fan blades of the gas turbine engine at all regardless of whether the engine is in operation.

SUMMARY

A method of inspecting blades of a gas turbine engine for abnormalities according to an example embodiment of the present disclosure includes projecting light from a light source into an illumination area; utilizing a sensor to record data of at least one reflection of the projected light from a blade that is part of a gas turbine engine and is disposed in the illumination area; determining, based on the recorded data, whether the blade is abnormal; and based on the determining indicating that the blade is abnormal, providing a blade abnormality notification.

In a further embodiment of the foregoing embodiment, the blade is one of a plurality of blades that extend radially outwards from a hub; said projecting is performed while the plurality of blades rotate about a longitudinal axis during operation of the gas turbine engine, such that the light source projects light onto each of the plurality of blades as they pass through the illumination area; and said utilizing a sensor and said determining are performed for reflections of the projected light from each of the plurality of blades.

In a further embodiment of any of the foregoing embodiments, said operation of the gas turbine engine corresponds to a flight, and said projecting, utilizing, determining, and providing are performed during the flight.

In a further embodiment of any of the foregoing embodiments, based on a rotational speed of the hub, the notification is provided in a manner that indicates at least one of: a quantity of blades that are determined to be abnormal; or which one or more particular ones of the plurality of blades are abnormal.

In a further embodiment of any of the foregoing embodiments, said projecting light includes projecting the light through at least one cylindrical lens disposed between the light source and the illumination area.

In a further embodiment of any of the foregoing embodiments, said projecting light includes utilizing the at least one cylindrical lens to arrange the projected light into a generally planar light sheet in the illumination area which forms a line or curve of a surface of the blade.

In a further embodiment of any of the foregoing embodiments, the light source includes a laser and the at least one cylindrical lens includes a first cylindrical lens and a second cylindrical lens. The first cylindrical lens is concave, is disposed between the light source and illumination area, and provides a decollimating feature that causes the projected light to diverge into a first light sheet as the projected light approaches the second cylindrical lens. The second cylindrical lens is convex, is disposed between the first cylindrical lens and the illumination area, and provides a collimating feature that causes the diverged projected light to become a second light sheet that is more collimated than the first light sheet as the projected light approaches the illumination areas.

In a further embodiment of any of the foregoing embodiments, the first cylindrical lens extends along a first longitudinal axis; the at least one cylindrical lens includes a third cylindrical lens that is concave, is disposed between the second cylindrical lens and the illumination area, and extends along a second longitudinal axis; and the second longitudinal axis is rotated approximately 90° with respect to the first longitudinal axis.

In a further embodiment of any of the foregoing embodiments, the light source includes a plurality of light-emitting diodes and the at least one cylindrical lens includes a convex cylindrical lens that causes the projected light to converge as it approaches the illumination area.

In a further embodiment of any of the foregoing embodiments, said utilizing a sensor to record data of at least one reflection of the projected light comprises utilizing at least one photodiode to record the data.

In a further embodiment of any of the foregoing embodiments, said utilizing the sensor to record data includes recording a time trace of sensor data; and said determining, based on the recorded data, whether the blade is abnormal includes utilizing a neural network to analyze the time trace and determine whether the blade is abnormal, wherein the neural network is trained with historical data of reflections of projected light from blades of one or more gas turbine engines.

A gas turbine engine according to an example embodiment of the present disclosure includes a light source configured to project light into an illumination area, a hub and a plurality of blades that extend radially outward from the hub and are configured to rotate about a longitudinal axis through the illumination area, and a sensor configured to record data of at least one reflection of the projected light from one of the plurality of blades disposed in the illumination area. The gas turbine engine also includes processing circuitry configured to determine, based on the recorded data, whether the blade is abnormal and based on the determination indicating that the blade is abnormal, provide a blade abnormality notification.

In a further embodiment of the foregoing embodiment, the blades are fan blades in a fan section of the gas turbine engine.

In a further embodiment of any of the foregoing embodiments, the sensor is configured to measure reflections of the projected light as the blades rotate through the illumination area. The processing circuitry is configured to, based on a rotational speed of the hub, determine at least one of a quantity of blades that are abnormal or which one or more particular ones of the plurality of blades are abnormal; and provide the notification in a manner that indicates said at least one of the quantity of blades that are abnormal or which one or more particular ones of the plurality of blades are abnormal.

In a further embodiment of any of the foregoing embodiments, the gas turbine engine includes at least one cylindrical lens disposed between the light source and the illumination area, and the light source is configured to project the light into the illumination area through the at least one cylindrical lens.

In a further embodiment of any of the foregoing embodiments, the at least one cylindrical lens is configured to arrange the projected light into in a generally planar light sheet in the illumination area that forms a line or curve on a surface of the blade.

In a further embodiment of any of the foregoing embodiments, the light source includes a laser; the at least one cylindrical lens includes a first cylindrical lens and a second cylindrical lens; the first cylindrical lens is concave, is disposed between the light source and illumination area, and provides a decollimating feature that causes the projected light to diverge into a first light sheet as the projected light approaches the second cylindrical lens; and the second cylindrical lens is convex, is disposed between the first cylindrical lens and the illumination area, and provides a collimating feature that causes the projected light to become a second light sheet that is more collimated than the first light sheet as the projected light approaches the illumination area.

In a further embodiment of any of the foregoing embodiments, the first cylindrical lens extends along a first longitudinal axis; the at least one cylindrical lens includes a third cylindrical lens that is concave, is disposed between the second cylindrical lens and the illumination area, and extends along a second longitudinal axis; and the second longitudinal axis is rotated approximately 90° with respect to the first longitudinal axis.

In a further embodiment of any of the foregoing embodiments, the light source includes a plurality of light-emitting diodes. The at least one cylindrical lens includes a convex cylindrical lens that causes the projected light to converge as it approaches the illumination area.

In a further embodiment of any of the foregoing embodiments, the sensor includes at least one photodiode.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
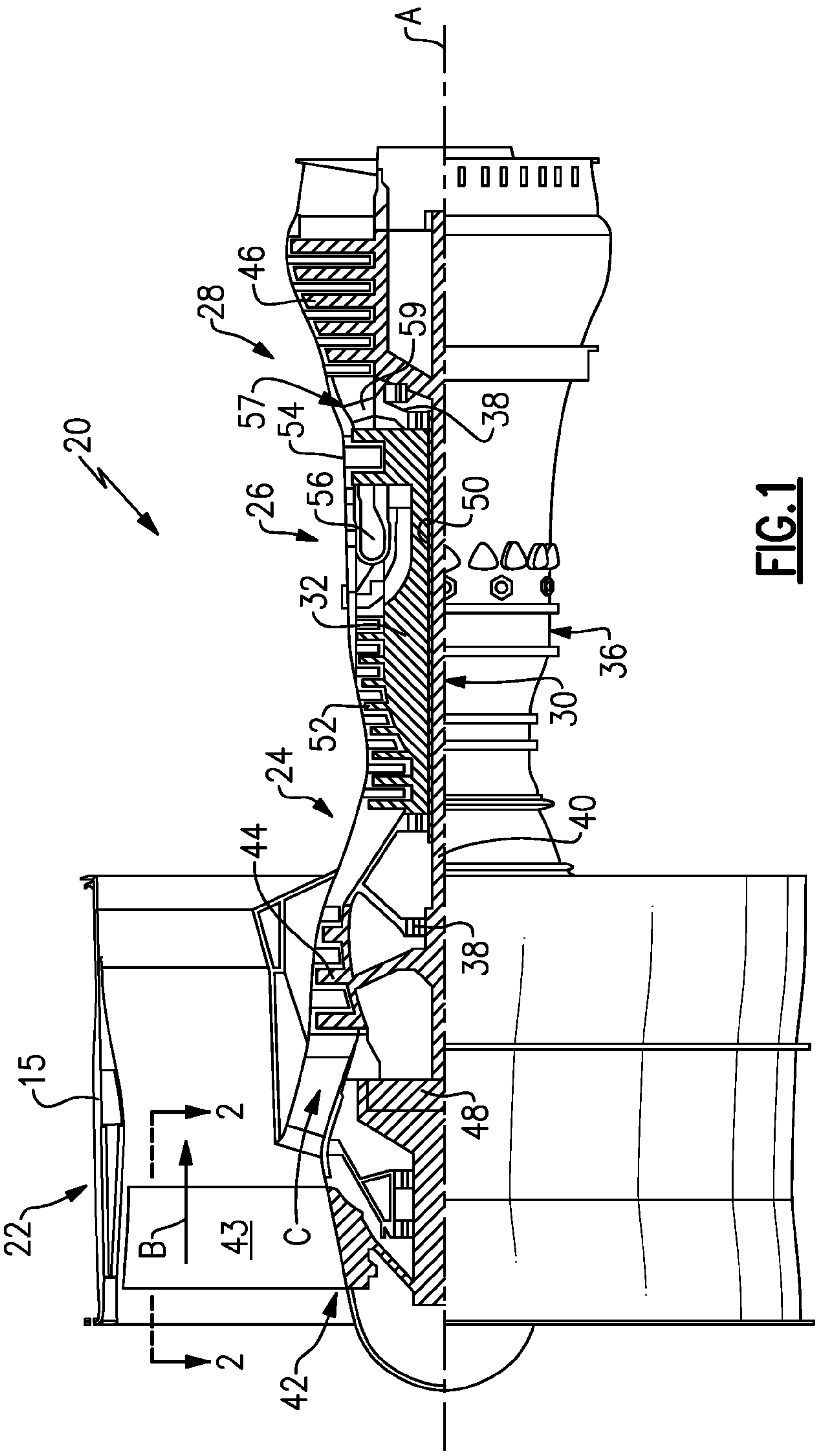
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC)"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram } ^\circ \text{R})/(518.7^\circ \text{R})]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figures 2, 2A:
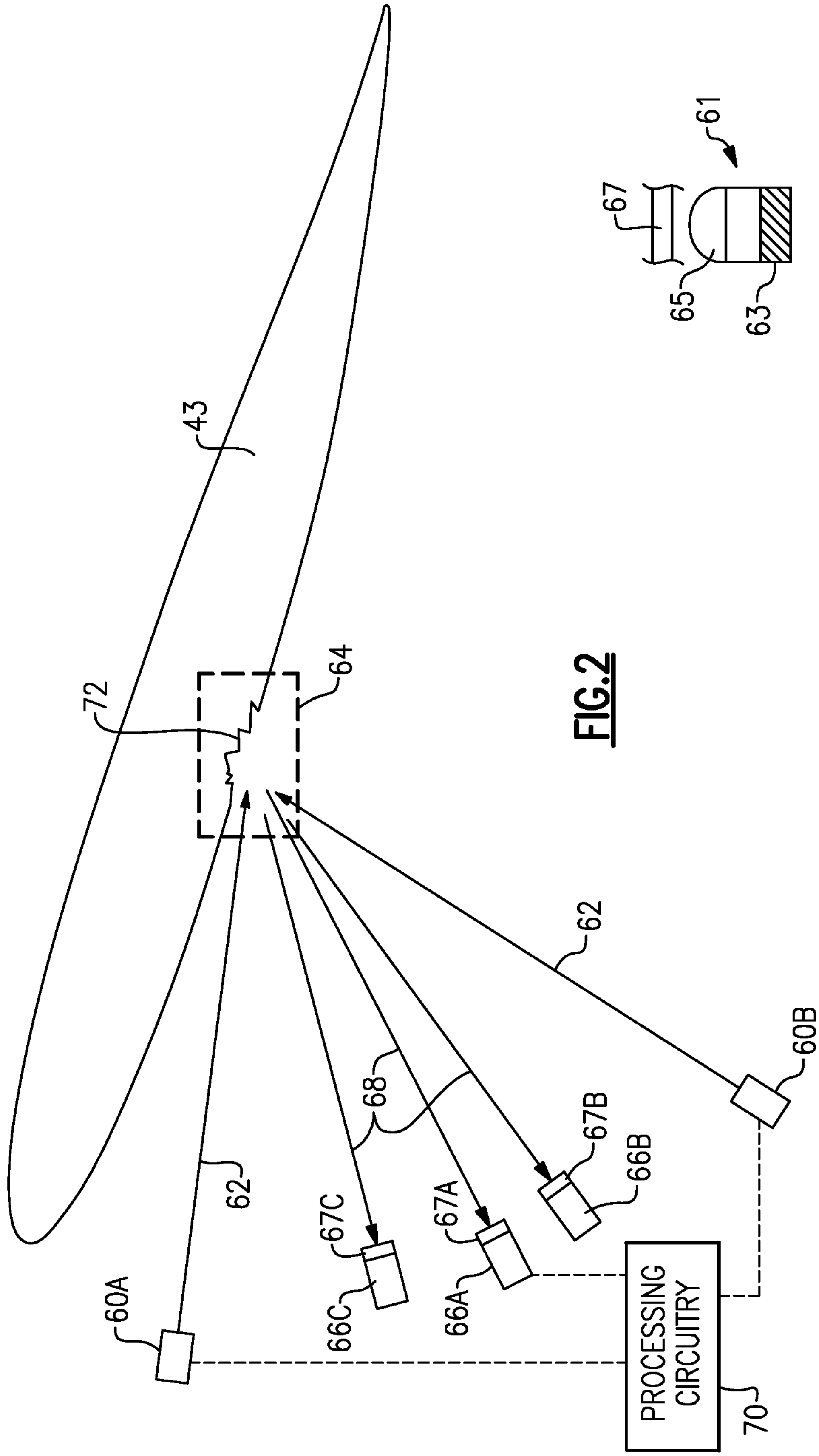
FIG. 2 schematically illustrates a cross-sectional view of a fan blade of FIG. 1 taken along line 2-2 of FIG. 1.

FIG. 2 schematically illustrates a cross-sectional view of a fan blade 43 of FIG. 1 taken along line 2-2 of FIG. 1. A plurality of light sources 60A-B are provided that project light 62 into an illumination area 64, and the projected light 62 is reflected from the fan blade 43 as reflection 68. The light sources 60A-B may include lasers or arrays of light-emitting diodes (LEDs), for example. A sensor 66 records data (transient or snapshot) of the reflection 68 of the projected light 62 from the fan blade 43 in the illumination area 64. In one example, the sensor includes one or more photodiodes each having a respective associated lens assembly that measure a brightness of the reflected light. Optionally, a polarizing filter 67 may be disposed between the sensor 66 and illumination area 64.

Processing circuitry 70 is operatively connected to the sensor 66 to obtain the recorded data, and may optionally also be connected to the light sources 60A-B to control operation of the light sources 60A-B. The processing circuitry 70 may include one or more microprocessors, microcontrollers, application specific integrated circuits (ASICs), or the like, for example, and may be part of a FADEC of the gas turbine engine 20.

The processing circuitry 70 is configured to determine, based on the recorded data, whether the fan blade 43 is abnormal, and based on a determination that the fan blade 43 is abnormal, provide a blade abnormality notification.

In one example, the abnormality detection includes comparing a brightness value of the reflection, as detected by a photo diode sensor 66, to a defined glare threshold to determine if the blade is exhibiting glare. In one example, the abnormality detection includes extracting one or more features from the recorded sensor data which indicates a brightness of the reflections, and comparing the extracted features to expected features. The extracted features may include one or more of the following, for example:

- a rise time of a brightness of the reflection from a first value and a to a second value;
- a fall time of a brightness value of the reflection from a first value to a second value;
- a peak brightness value that differs from an expected brightness value (e.g., of a non-abnormal area);
- a sharpness of a peak of the peak brightness value; and/or
- an average duration of a brightness value or range of values.

Thus, in one "rise time" example, the abnormality detection includes extracting a rise time of a brightness of the reflection from a first value and a to a second value from the sensor data, and comparing that rise time to an expected rise time. If the determined rise time differs from the expected rise time by more than a predefined threshold, then an abnormality (which may be indicative of glare) is determined.

In one "fall time" example, the abnormality detection includes extracting a fall time of a brightness value of the reflection from a first value to a second value from the sensor data, and comparing that fall time to an expected fall time. If the determined fall time differs from the expected fall time by more than a predefined threshold, then an abnormality (which may be indicative of glare) is determined.

In one "peak brightness" example, the abnormality detection includes extracting a peak brightness value from the sensor data, and comparing the peak brightness to an expected peak brightness. If the determined peak brightness differs from the expected peak brightness time by more than a predefined threshold, then an abnormality (which may be indicative of glare) is determined.

In one "sharpness" example, the abnormality detection includes extracting a sharpness of a peak of a peak brightness value from the sensor data, and comparing the sharpness to an expected sharpness. If the determined sharpness differs from the expected sharpness by more than a predefined threshold, then an abnormality (which may be indicative of glare) is determined.

In one "average brightness" example, the abnormality detection includes extracting an average brightness of a peak of a peak brightness value from the sensor data, and comparing the sharpness to an expected sharpness. If the determined sharpness differs from the expected sharpness by more than a predefined threshold, then an abnormality (which may be indicative of glare) is determined The processing circuitry 70 analyzes the one or more extracted features to determine whether the blade is abnormal. Fan blades 43 may have abnormalities for a number of reasons, such as wear due to contact with inlet debris (e.g., bird strikes, etc.). Because light will reflect differently off of abnormal regions than non-abnormal regions by exhibiting glare in light reflections or difference in the scattering of the reflected light, the abnormal regions can be detected based on the presence of these difference in the characteristics of the reflected light. Thus, abnormality 72 of the fan blade 43 can be detected by the sensor 66 in cooperation with the processing circuitry 70. In some examples, such as where photo diode sensors are used which have fast response times, that detection can be performed during engine operation (e.g., aircraft taxiing or flight).

In one example, a time trace of sensor data values (e.g., brightness values) are analyzed to determine unexpected changes in brightness, such as an unexpected peak, an unexpected rise time, an unexpected fall time, etc. according to the features discussed above. In one such example, the processing circuitry 70 feeds the time trace to a neural network and uses machine learning for detection of abnormalities. The neural network may be trained with training data of non-abnormal blades prior to the feeding.

FIG. 2A schematically illustrates an example photodiode assembly 61 that may be used as the sensor 66. The photodiode assembly 61 includes a photodiode 63 and a wide-angle lens 65 that provides a desired field of view to the photodiode 63. Photodiodes have a fast response time, and in one example photodiodes are used to facilitate detection even when the engine is fully operating. Optionally, a polarizing filter 67 may be included as well.

Figure 3A:
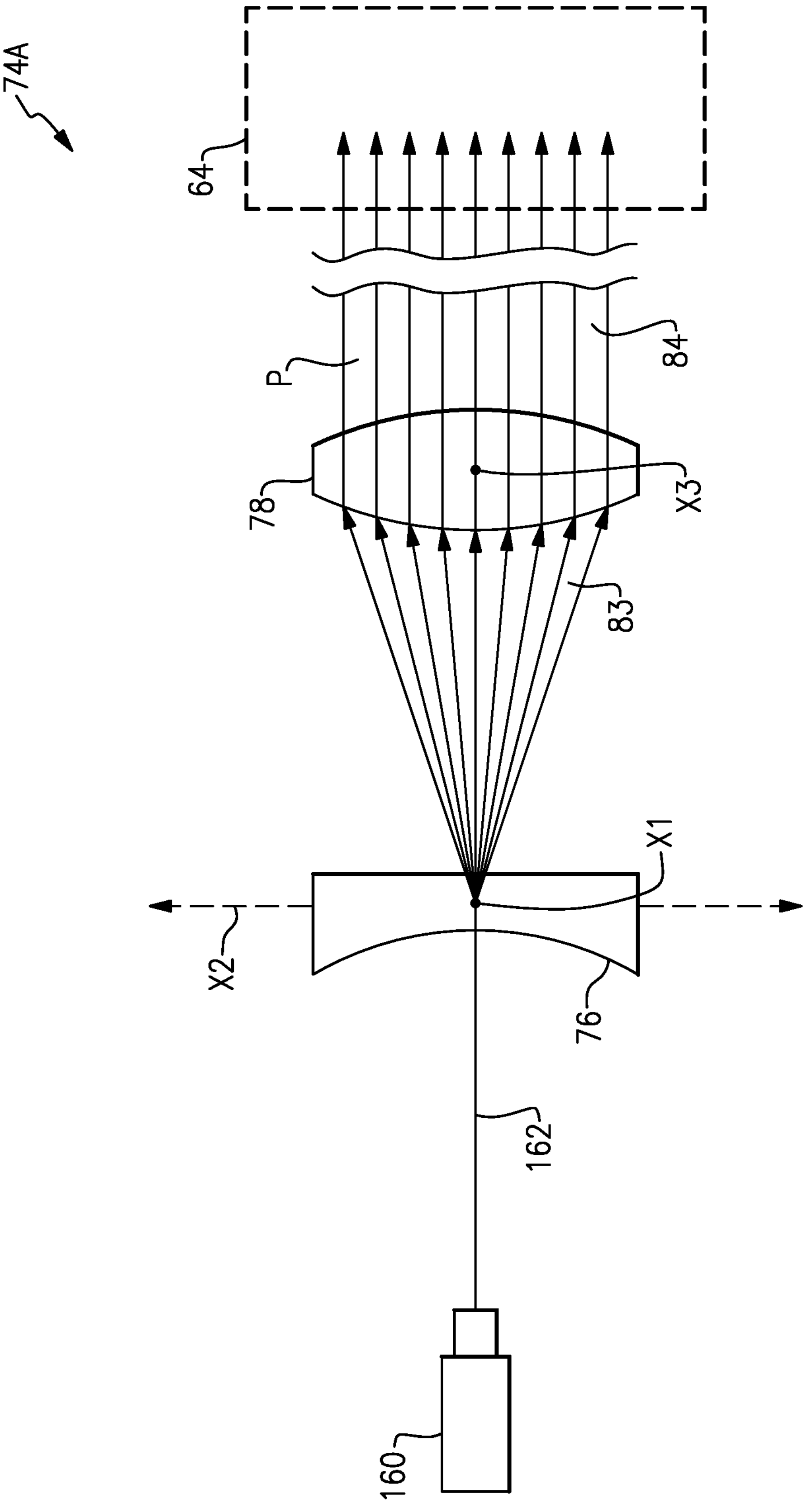
FIG. 3A schematically illustrates a view of an example lighting configuration that utilizes a plurality of cylindrical lenses.

FIG. 3A schematically illustrates an example lighting configuration 74A in which the light source 60 is a laser 160 and the projected light 162 is a laser beam. Lens 76 and lens 78, which are both cylindrical lenses, are provided between the laser 160 and the illumination area 64. Lens 76 is disposed between the laser 160 and the illumination area 64, and lens 78 is disposed between the lens 76 and the illumination area 64. The primary purpose of the cylindrical lenses 76, 78 is to change the laser beam into a laser sheet 84 which, when the fan blade rotates, would allow it to sweep out an area on the surface of the blade.

Lens 76 is a cylindrical concave lens that extends along a central longitudinal axis X1 and provides a decollimating feature that causes the projected light 162 to diverge relative to an axis X2 as the projected light 162 forming a first light sheet 83 that approaches the illumination area 64 and forms a line or curve on a blade 43 in the illumination area 64. The axis X2 is transverse to (and in one example generally perpendicular to) axis X1.

Lens 78 is a convex lens with a smooth surface. However, the surface does not have to be smooth, and may include several facets of flat surfaces such as a Powell Lens, for example. The lens 78 extends along a central longitudinal axis X3. In one example, the axes X1 and X3 are generally parallel to each other.

Lens 78 provides a collimating feature that causes the first light sheet 83 to become a generally planar second light sheet 84 that is more collimated than the first light sheet 83 as the light approaches the illumination area 64. In one example, axis X2 lies within a plane P of the generally planar light sheet 84. In one example, the generally planar light sheet 84 in the example of FIG. 3A has a thickness of approximately 0.1 mm-5 mm. The lenses 76, 78 may be arranged to form a light sheet of a desired thickness depending on the size of a target abnormality feature on the surface of the blade 43.

Figure 3B:
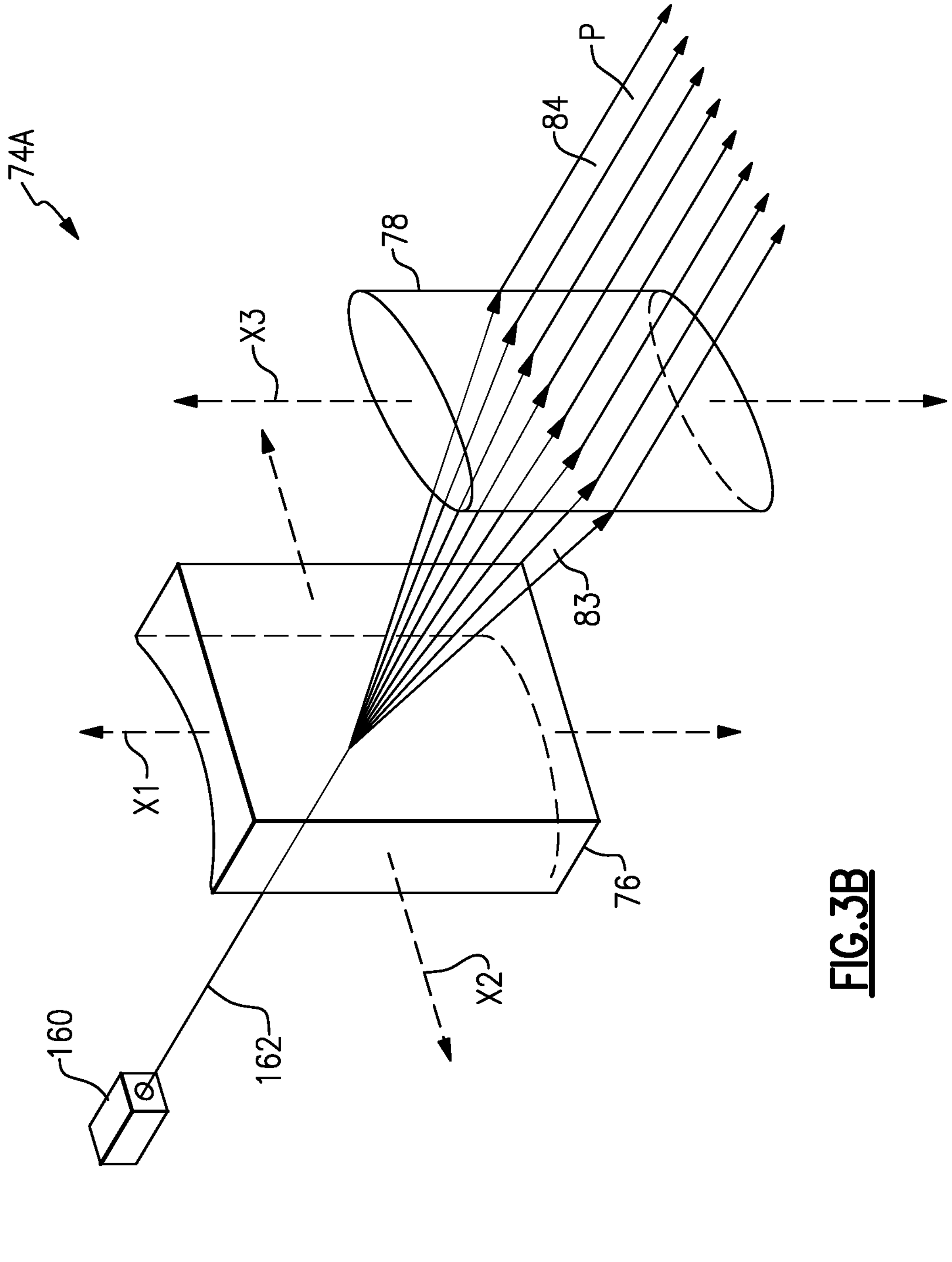
FIG. 3B schematically illustrates a perspective view of the lighting configuration of FIG. 3A.

FIG. 3B schematically illustrates a perspective view of the example lens arrangement 74A. Although only two lenses 76, 78 are shown, it is understood that one or more additional lenses could be used, such as additional cylindrical and/or aspherical lenses to adjust of the quality of the light (e.g., a thickness of the light shield).

Figure 4A:
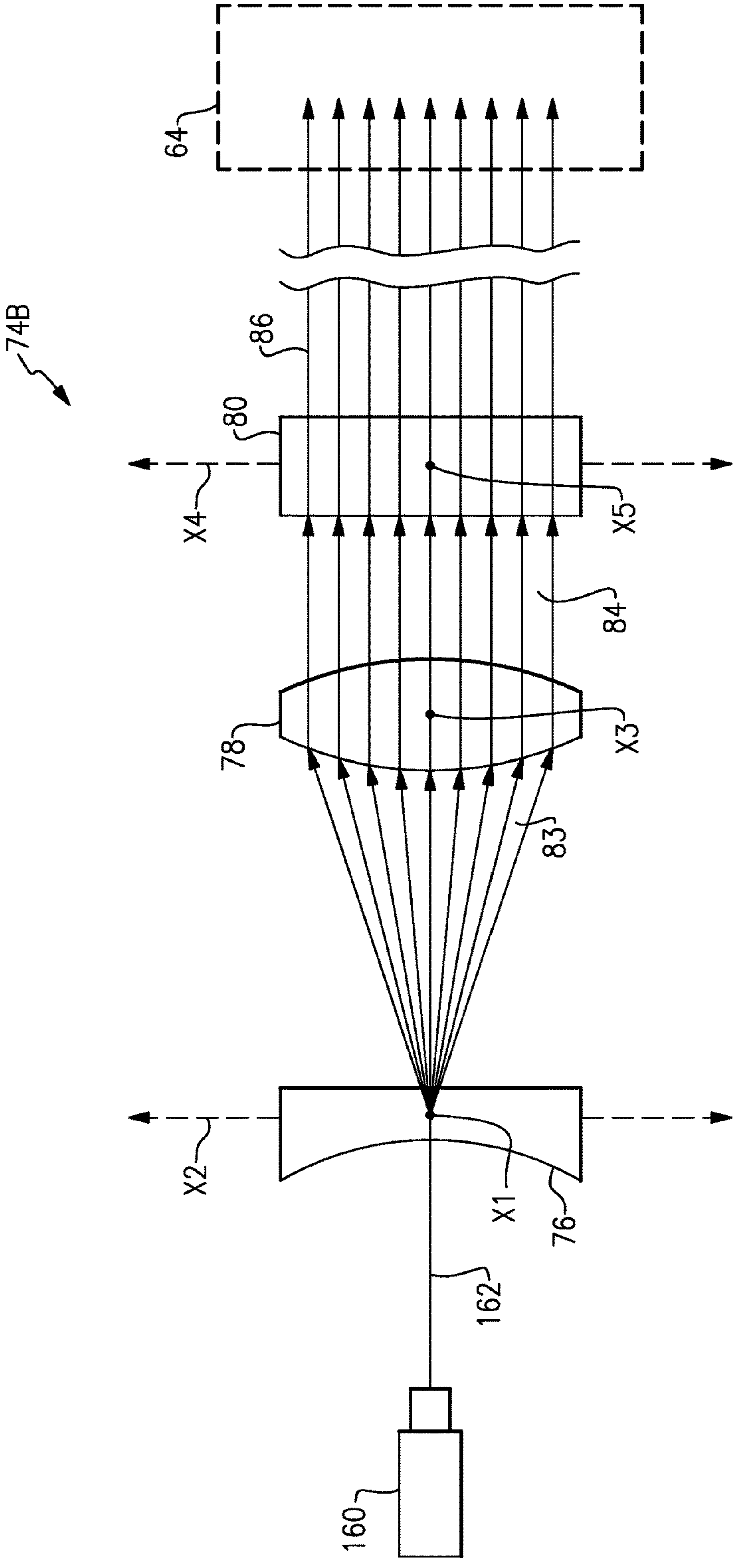
FIG. 4A schematically illustrates a view of another example lighting configuration that utilizes a plurality of cylindrical lenses.

FIG. 4A schematically illustrates an example lighting configuration 74B which adds a cylindrical lens 80 to the configuration 74A of FIGS. 3A-B. In the lighting configuration 74B, lens 80 is disposed between lens 78 and the illumination area 64. Lens 80 is a concave lens that extends along a central longitudinal axis X4 and provides a decollimating feature that causes the projected light 162 of the generally planar light sheet 84 to diverge relative to an axis X5 as the projected light 162 approaches the illumination area 64. This adds thickness to the generally planar light sheet 84 to provide a thickened light sheet 86. In one example, the thickened light sheet 86 in the example of FIG. 3A has a thickness of approximately the size of the expected abnormality (e.g., on the order of 1 mm).

In one example, axes X1, X3, and X5 are generally parallel to each other, and axes X2 and X4 are generally parallel to each other. In one example, one, more, or all of axes X1, X3, and X5 are rotated approximately 90° with respect to one or both of axes X2 and X4. As used herein, approximately means plus or minus 5°.

Figure 4B:
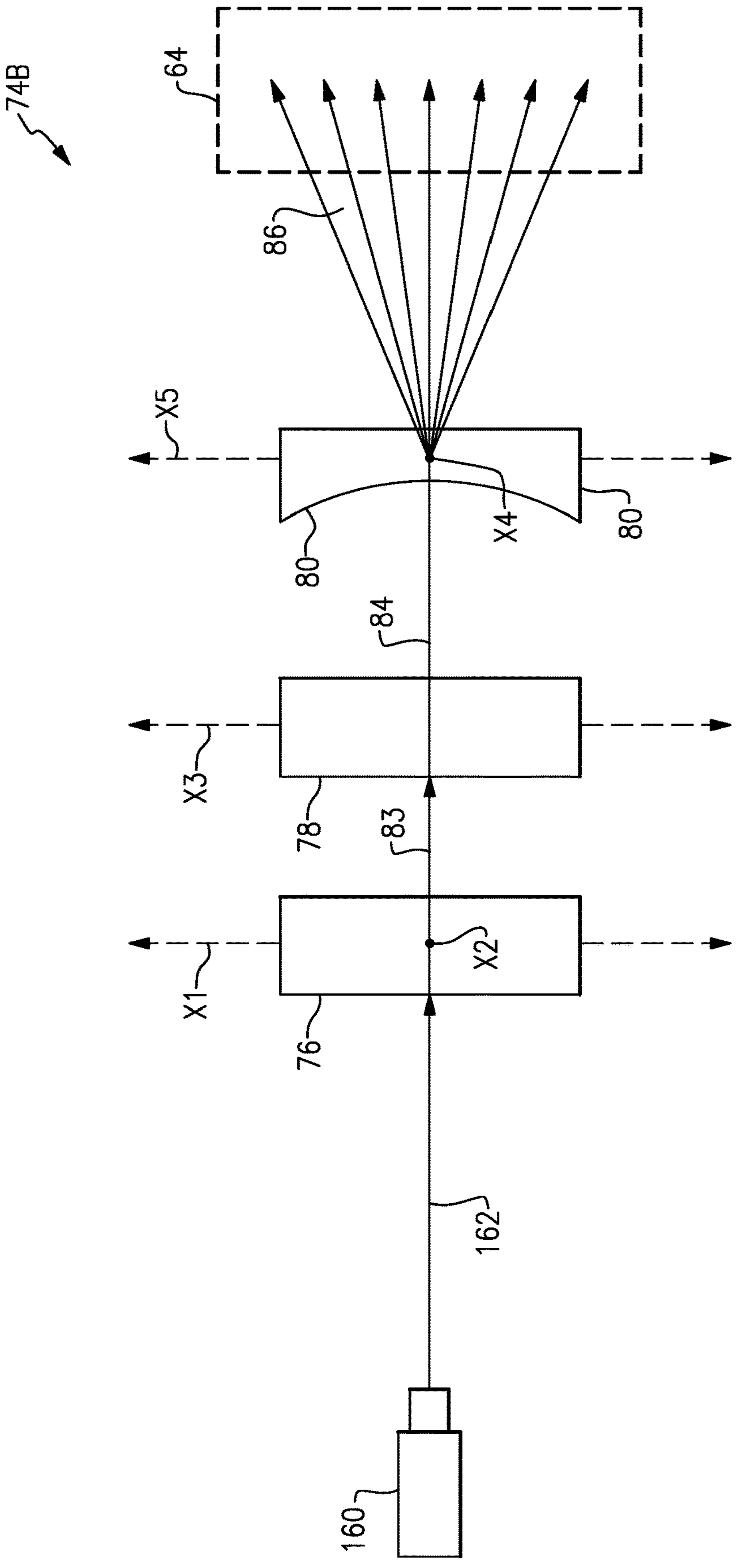
FIG. 4B schematically illustrates another view of the lighting configuration of FIG. 4A.

FIG. 4B schematically illustrates another view of the example lighting configuration 74B in which the thickened light sheet 86 can be seen more clearly.

Figure 4C:
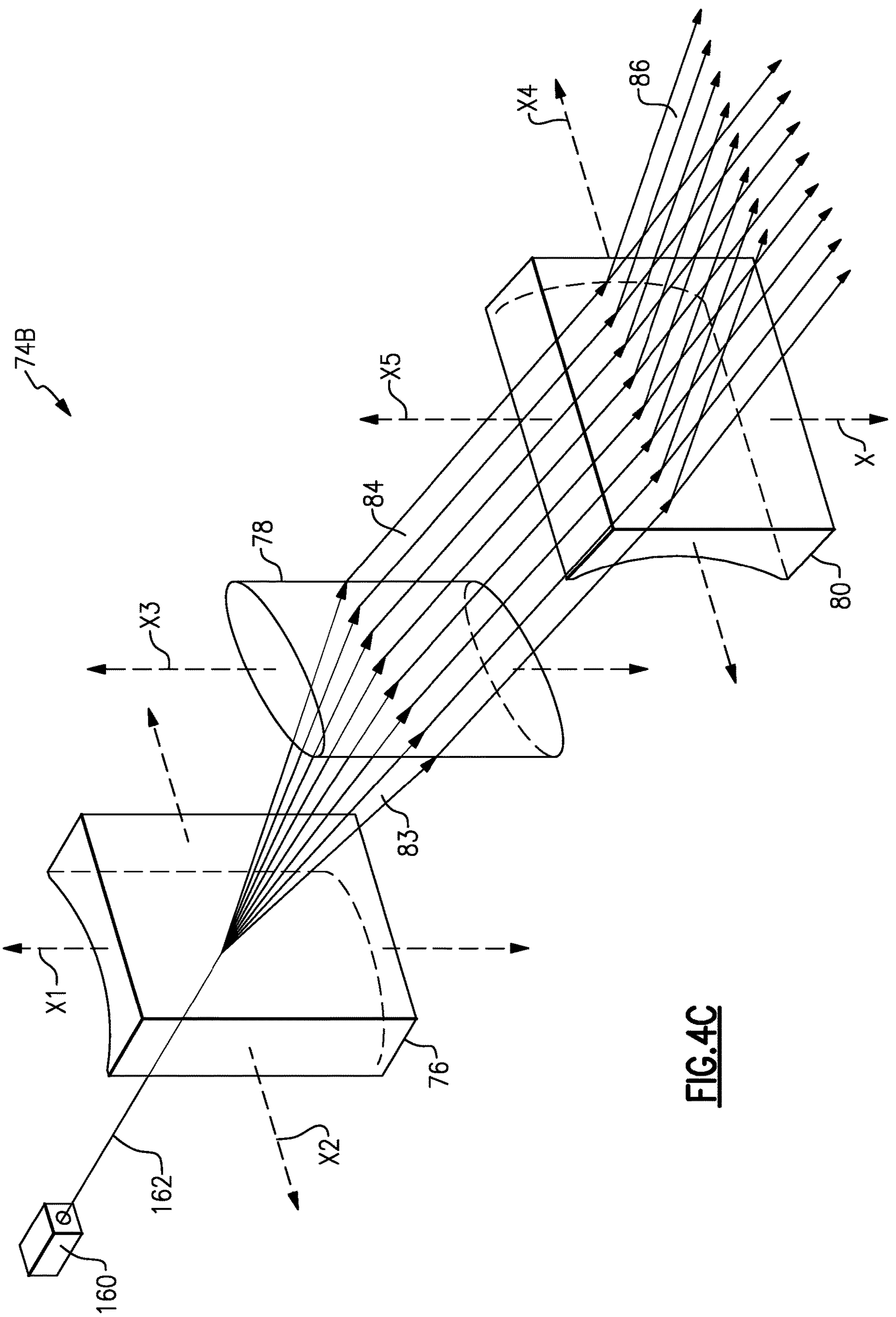
FIG. 4C schematically illustrates a perspective view of the lighting configuration of FIG. 4A.

FIG. 4C schematically illustrates a perspective view of the example lighting configuration 74B.

Figure 5A:
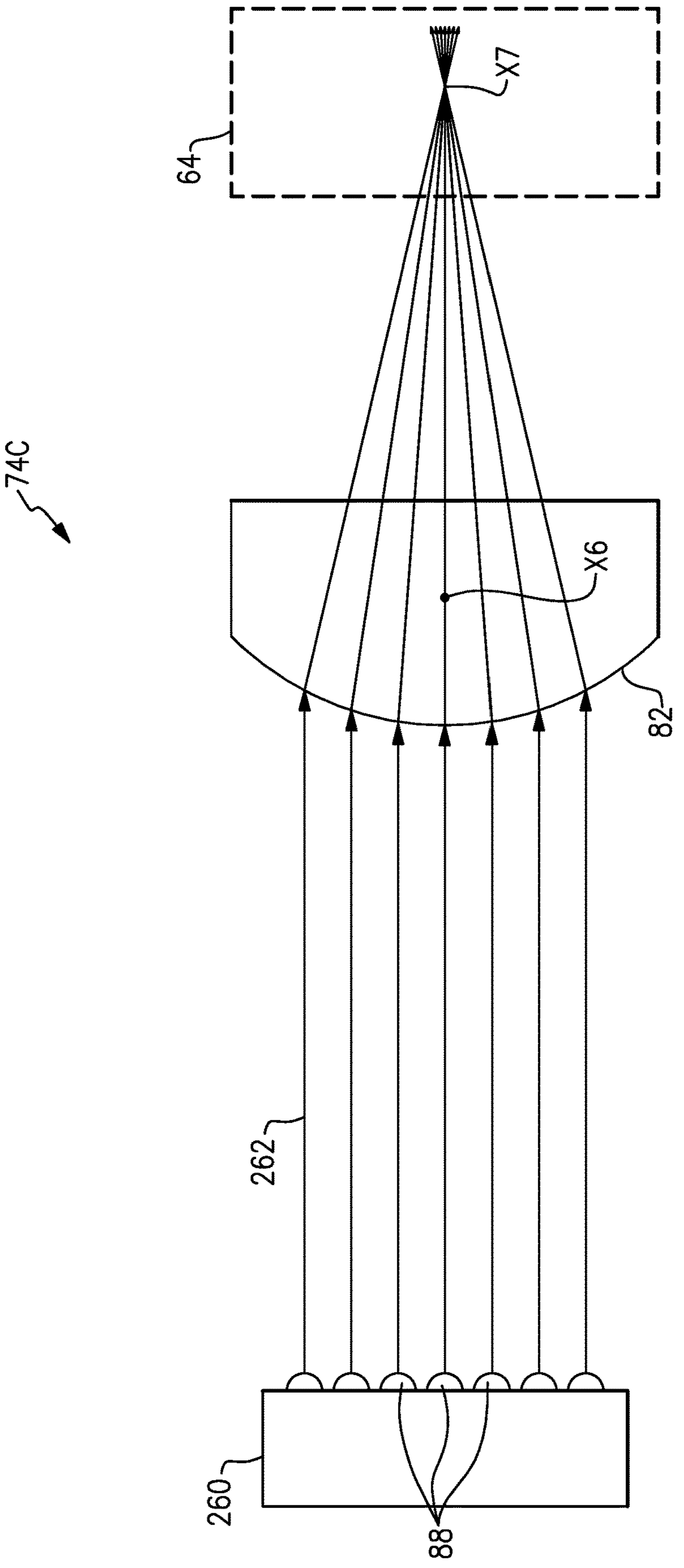
FIG. 5A schematically illustrates a view of another example lighting configuration that utilizes a cylindrical lens.

FIG. 5A schematically illustrates an example lighting configuration 74C which utilizes an LED array 260 as the light source 60. The LED array 260 includes a plurality of LEDs 88. A cylindrical lens 82, which is a convex lens, is disposed between the LED array 260 and the illumination area 64. The lens 82 extends along a central longitudinal axis X6. Unlike the laser beam from laser 160, the projected light 262 from the LED array 260 is generally non-coherent (i.e., having different wavelengths and phases) and non-collimated. The lens 82 causes the projected light 262 to converge towards an axis X7 in the illumination area 64 as the projected light 262 approaches the illumination area 64.

Figure 5B:
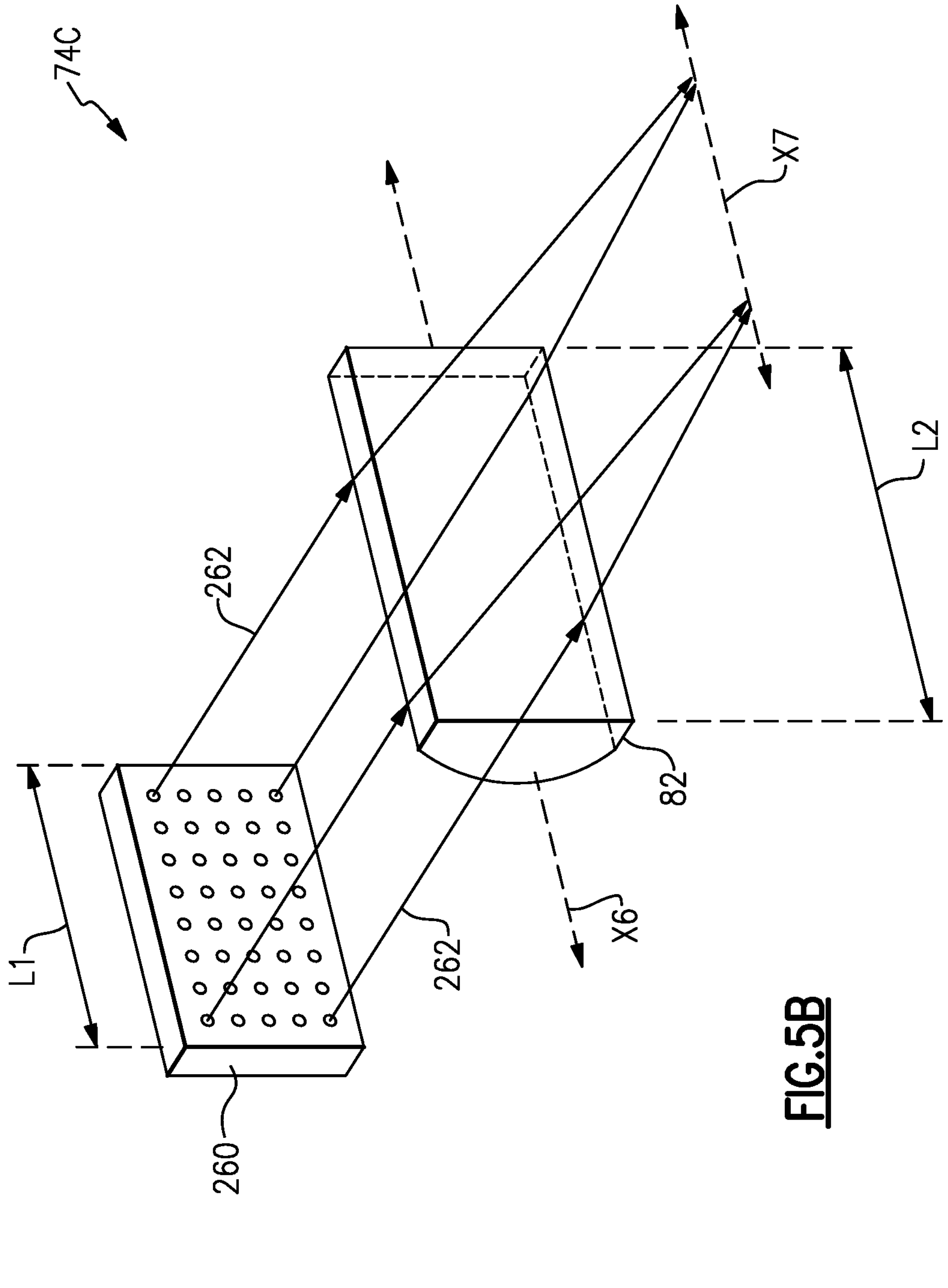
FIG. 5B schematically illustrates a perspective view of the lighting configuration of FIG. 5A.

FIG. 5B schematically illustrates a perspective view of the lighting configuration 74C. As shown in FIG. 5B, the LED array 260 has a length L1 and the lens 82 has a length L2. In one example, the length L2 is greater than or equal to the length L1. Although the light emitted from the LED array 260 in FIGS. 5A-B appears to be collimated, it is understood that the light emitted from the LED array 260 would likely be non-coherent and non-collimated, as discussed above.

Each of the example lighting configurations 74A-C includes at least one cylindrical lens disposed between the light source 60 and the illumination area 64, and in each configuration 74A-C, the light source 60 is configured to project the projected light into the illumination area 64 through the at least one cylindrical lens.

Figure 6:
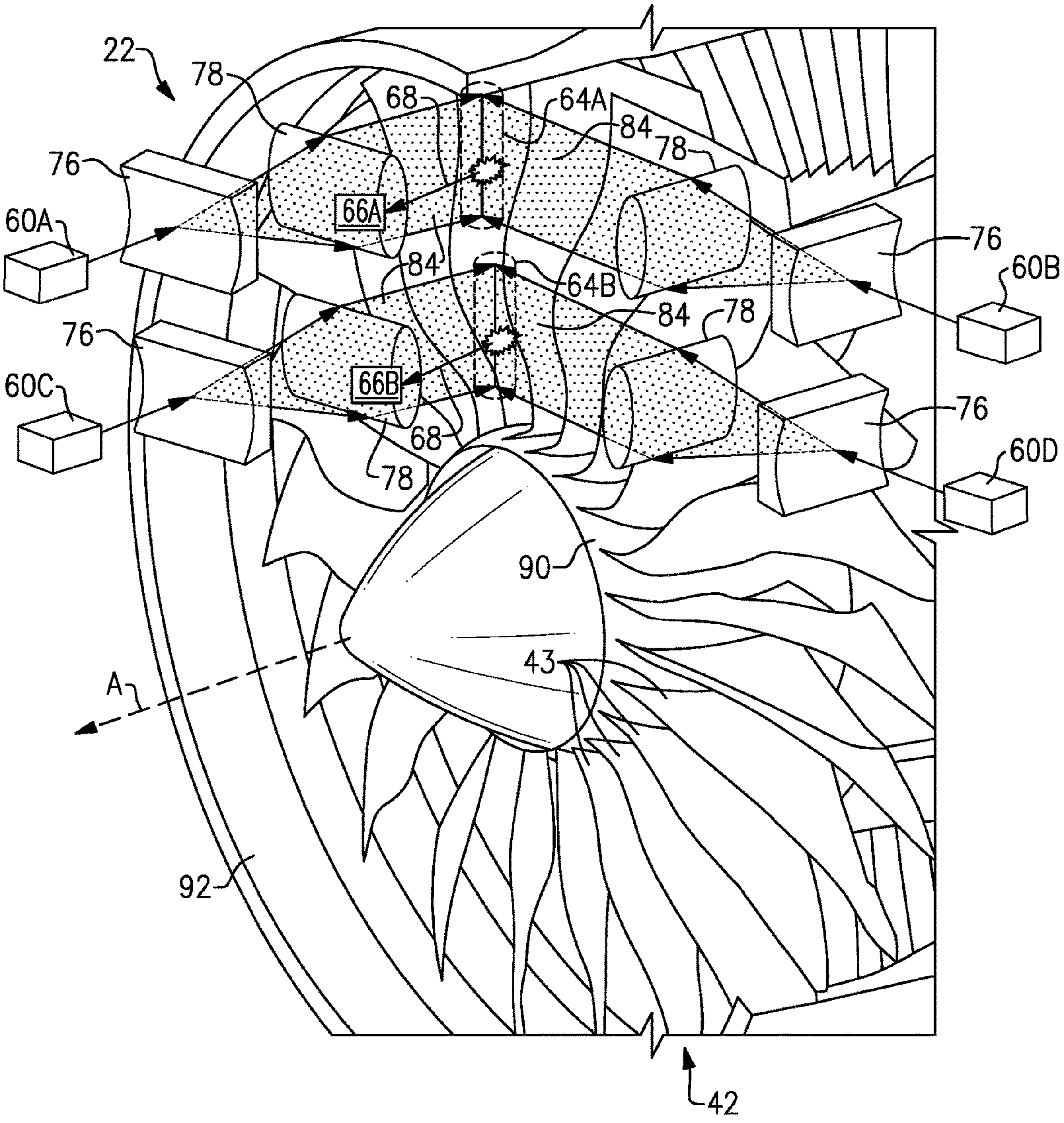
FIG. 6 is a perspective view of a fan section of the gas turbine engine of FIG. 1.

FIG. 6 is a perspective view of the fan section 22 of the engine of FIG. 1 of FIG. 2 in which lighting configuration 74A of FIGS. 3A-B is utilized. The fan 42 is provided in the fan section 22, and the fan 42 includes a hub 90 and a plurality of fan blades 43 that extend radially outward from the hub 90 and are configured to rotate about the engine central longitudinal axis A.

A plurality of light sources 60A-B are configured to project light into an illumination area 64A in the fan section 22, and one or more reflections 68 of the projected light from illumination area 64A are detected by sensor 66A. Similarly, a plurality of light sources 60C-D are configured to project light into illumination area 64B in the fan section 22, and one or more reflections 68 of the projected light from illumination area 64B are detected by sensor 66B. The illumination area 64A is disposed radially outward of the illumination area 64B with respect to the engine central longitudinal axis A. Each of the light sources 60A-D and sensors 66A-B are disposed fore of the fan blades 43. As used herein, “fore” is used with reference to normal operational attitude of the gas turbine engine 20.

As shown in FIG. 6, the illumination areas 64A-B are arranged along a direction from radially inner location (proximate to the hub 90) to a radially outer position to allow the system to cover a desired radial span of each fan blade 43, and potentially an entire length of a blade 43.

The light sources 60A-D and sensors 66A-B may be mounted to cowl 92 of the gas turbine engine 20, or for some type of military engine installation, on an inner surface of the S-duct, for example.

Figure 7:
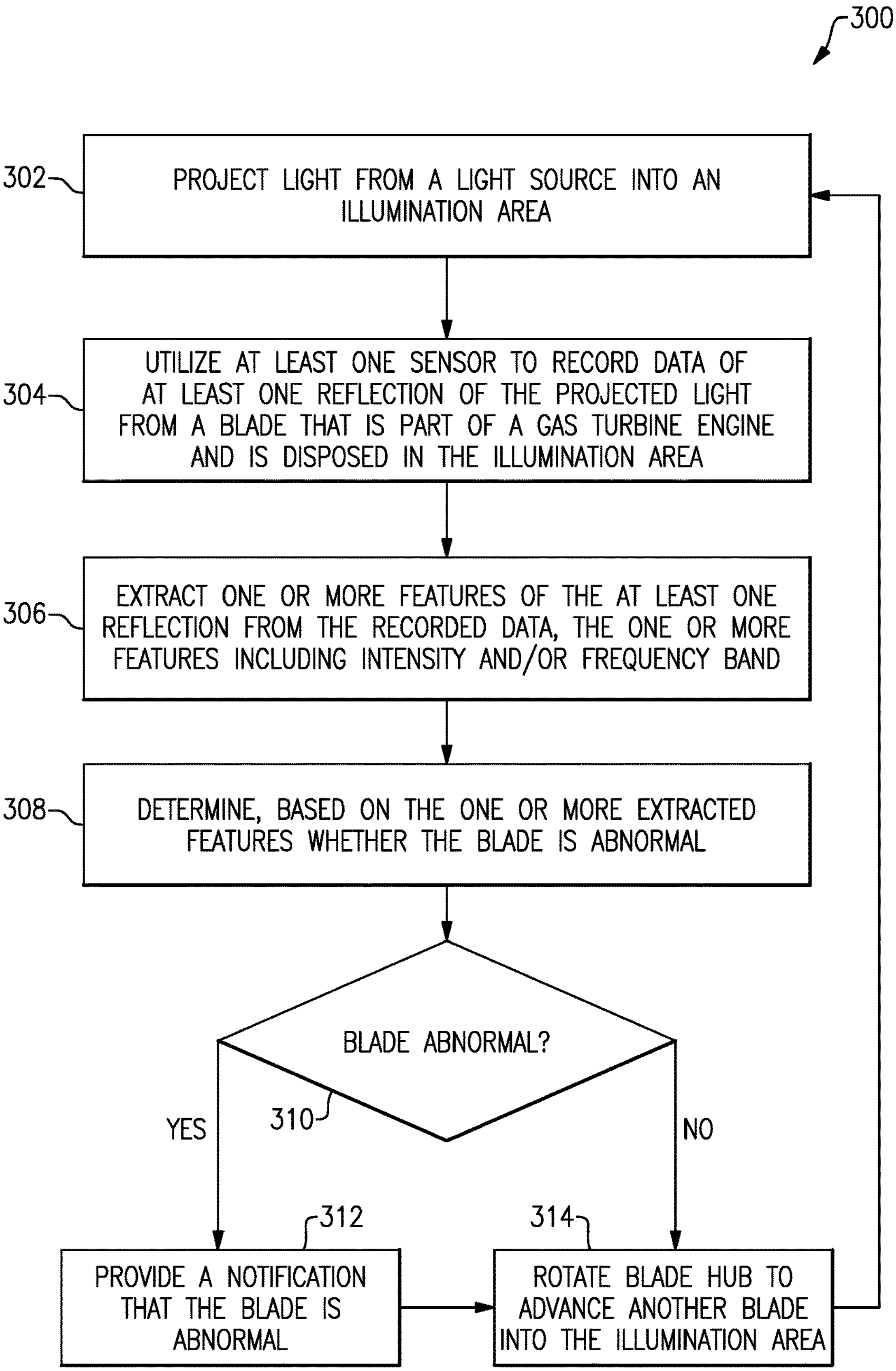
FIG. 7 is a flowchart of an example method of inspecting blades of a gas turbine engine for abnormalities.

FIG. 7 is a flowchart of an example method 300 of inspecting blades of the gas turbine engine 20 for abnormalities. Light 62 is projected from light source 60 into an illumination area 64 (step 302). A sensor 66 is utilized to record data of at least one reflection 68 of the projected light 62 from a blade (e.g., a fan blade 43) that is part of the turbine engine 20 and is disposed in the illumination area 64 (step 304).

A determination is made based on the recorded data of whether the blade is abnormal (e.g., its surface exhibits damaged areas) (step 306). If the blade is abnormal (a “yes” to decision block 308), a blade abnormality notification is provided that indicates the blade is abnormal (step 310). A hub from which the blade extends (e.g., fan hub 90) rotates (e.g., based on the engine being running) and advances another blade into the illumination area 64, and the method proceeds back to step 302 so that data can be recorded for light reflections from other blades.

If the blade is not abnormal (a “no” to decision block 308), step 310 is skipped and the method proceeds to step 312.

In one example, step 304 includes recording a time trace of brightness values of the reflection(s) 68. As discussed above, determination of whether a blade is abnormal may be based on features of the reflected light, such as a rise and/or fall time of brightness between two values, or any of the other features discussed above. In one example, the processing circuitry 70 feeds the time trace to a neural network and uses machine learning for detection of abnormalities.

Although fan blades 43 have been discussed above, it is understood that the techniques discussed herein could be applied to other blades, such as in the compressor section 24 or turbine sections 28 of the gas turbine engine 20. In one example, the compressor section 24 and/or turbine section 28 blades are only monitored when the gas turbine engine 20 is not operating, as this would avoid subjecting the light source(s) 60 and sensor(s) 66 to the high temperatures associated with operation of the gas turbine engine 20.

In one example, providing the blade abnormality notification in step 310 includes incrementing a counter that records a number of detections by the sensor 66 and/or issuing a warning flag such as a Health Report Code (HRC). In one example, the processing circuitry 70 stores not only a number of detections, but also one or more of the times of occurrence, the total number of revolutions of the hub during an operation period, and the duration of engine operation period, etc. In one example, the warning flag(s) are provided once the counter exceeds a counter threshold.

In one example, the method 300 is performed during engine operation. In one example, the notification of step 310 is provided in a manner that indicates at least one of a quantity of blades that are determined to be abnormal or which one or more particular ones of the plurality of blades are abnormal. This may be based on determining a location of a particular blade (e.g., one whose location can be detected when it passes a particular point during rotation) and a rotational speed of the hub from which the blade extends.

Detection of small abnormalities (e.g., due to wear) on the surface of fan or other rotating blades while a gas turbine engine 20 is in operation posts a challenge due to the high-speed motion of the blades, the limitation of the sensor response time, and the demand on computational power to process the signal in real time on-board an engine. By using a fast response sensor such as a photodiode as part of the sensor 66, in some examples detection can be performed during operation of the gas turbine engine, and even during flight. In other conditions, such as when the engine 20 is not operating, a conventional Charged Couple Device (CCD), and Complementary Metal-Oxide Semiconductor (CMOS) camera sensor may be used. Thus, various embodiments of the method and system disclosed herein, and particularly those that use photodiodes with fast response times, may be used to detect abnormalities on the fan blade with sensors while the gas turbine engine 20 is in operation and/or when the aircraft is in flight.

Unlike inlet debris monitoring systems, the system and method disclosed herein can be used to detect abnormalities directly on blades of a gas turbine engine, such as fan blades 43, without requiring human inspection (e.g., using a borescope) when an aircraft is on the ground and not in operation.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method of inspecting blades of a gas turbine engine for abnormalities, comprising:

projecting light from a light source into an illumination area, wherein said projecting light includes projecting the light through at least one cylindrical lens disposed between the light source and the illumination area, and utilizing the at least one cylindrical lens to arrange the projected light into a generally planar light sheet in the illumination area which forms a line or curve on a surface of the blade;

utilizing a sensor to record data of at least one reflection of the projected light from a blade that is part of a gas turbine engine and is disposed in the illumination area;

determining, based on the recorded data, whether the blade is abnormal, wherein the determining comprises comparing a value describing an aspect of a brightness of the at least one reflection to an expected value; and based on the determining indicating that the blade is abnormal, providing a blade abnormality notification.

2. The method of claim 1, wherein:

the blade is one of a plurality of blades that extend radially outwards from a hub;

said projecting is performed while the plurality of blades rotate about a longitudinal axis during operation of the gas turbine engine, such that the light source projects light onto each of the plurality of blades as they pass through the illumination area; and said utilizing a sensor and said determining are performed for reflections of the projected light from each of the plurality of blades.

3. The method of claim 2, wherein said operation of the gas turbine engine corresponds to a flight, and said projecting, utilizing, determining, and providing are performed during the flight.

4. The method of claim 2, wherein based on a rotational speed of the hub, the notification is provided in a manner that indicates at least one of:

a quantity of blades that are determined to be abnormal; or which one or more particular ones of the plurality of blades are abnormal.

5. The method of claim 1, wherein:

the light source includes a laser;

the at least one cylindrical lens includes a first cylindrical lens and a second cylindrical lens;

the first cylindrical lens is concave, is disposed between the light source and illumination area, and provides a decollimating feature that causes the projected light to diverge into a first light sheet as the projected light approaches the second cylindrical lens; and the second cylindrical lens is convex, is disposed between the first cylindrical lens and the illumination area, and provides a collimating feature that causes the diverged projected light to become a second light sheet that is more collimated than the first light sheet as the projected light approaches the illumination areas.

6. The method of claim 5, wherein:

the first cylindrical lens extends along a first longitudinal axis;

the at least one cylindrical lens includes a third cylindrical lens that is concave, is disposed between the second cylindrical lens and the illumination area, and extends along a second longitudinal axis; and the second longitudinal axis is rotated approximately 90° with respect to the first longitudinal axis.

7. The method of claim 1, wherein:

the light source includes a plurality of light-emitting diodes; and the at least one cylindrical lens includes a convex cylindrical lens that causes the projected light to converge as it approaches the illumination area.

8. The method of claim 1, wherein said utilizing a sensor to record data of at least one reflection of the projected light comprises utilizing at least one photodiode to record the data.

9. The method of claim 1, wherein:

said utilizing the sensor to record data includes recording a time trace of sensor data; and said determining, based on the recorded data, whether the blade is abnormal includes utilizing a neural network to analyze the time trace and determine whether the blade is abnormal, wherein the neural network is trained with historical data of reflections of projected light from blades of one or more gas turbine engines.

10. A gas turbine engine, comprising:

a light source configured to project light into an illumination area;

a hub and a plurality of blades that extend radially outward from the hub and are configured to rotate about a longitudinal axis through the illumination area;

at least one cylindrical lens disposed between the light source and the illumination area, wherein the light source is configured to project the light into the illumination area through the at least one cylindrical lens, and wherein the at least one cylindrical lens is configured to arrange the projected light into in a generally planar light sheet in the illumination area that forms a line or curve on a surface of said one of the plurality of blades;

a sensor configured to record data of at least one reflection of the projected light from one of the plurality of blades disposed in the illumination area; and processing circuitry configured to:

determine, based on the recorded data, whether the blade is abnormal, wherein the determination includes a comparison of a value describing an aspect of a brightness of the at least one reflection to an expected value; and based on the determination indicating that the blade is abnormal, provide a blade abnormality notification.

11. The gas turbine engine of claim 10, wherein the blades are fan blades in a fan section of the gas turbine engine.

12. The gas turbine engine of claim 10, wherein:

the sensor is configured to measure reflections of the projected light as the blades rotate through the illumination area; and the processing circuitry is configured to:

based on a rotational speed of the hub, determine at least one of a quantity of blades that are abnormal or which one or more particular ones of the plurality of blades are abnormal; and provide the notification in a manner that indicates said at least one of the quantity of blades that are abnormal or which one or more particular ones of the plurality of blades are abnormal.

13. The gas turbine engine of claim 10, wherein:

the light source includes a laser;

the at least one cylindrical lens includes a first cylindrical lens and a second cylindrical lens;

the first cylindrical lens is concave, is disposed between the light source and illumination area, and provides a decollimating feature that causes the projected light to diverge into a first light sheet as the projected light approaches the second cylindrical lens; and the second cylindrical lens is convex, is disposed between the first cylindrical lens and the illumination area, and provides a collimating feature that causes the projected light to become a second light sheet that is more collimated than the first light sheet as the projected light approaches the illumination area.

14. The gas turbine engine of claim 13, wherein:

the first cylindrical lens extends along a first longitudinal axis;

the at least one cylindrical lens includes a third cylindrical lens that is concave, is disposed between the second cylindrical lens and the illumination area, and extends along a second longitudinal axis; and the second longitudinal axis is rotated approximately 90° with respect to the first longitudinal axis.

15. The gas turbine engine of claim 10, wherein:

the light source includes a plurality of light-emitting diodes;

the at least one cylindrical lens includes a convex cylindrical lens that causes the projected light to converge as it approaches the illumination area.

16. The gas turbine engine of claim 10, wherein the sensor includes at least one photodiode.

17. A method of inspecting blades of a gas turbine engine for abnormalities, comprising:

projecting light from a light source into an illumination area, wherein said projecting light includes projecting the light through at least one cylindrical lens disposed between the light source and the illumination area, and utilizing the at least one cylindrical lens to arrange the projected light into a generally planar light sheet in the illumination area which forms a line or curve on a surface of the blade;

utilizing a sensor to record data of at least one reflection of the projected light from a blade that is part of a gas turbine engine and is disposed in the illumination area;

determining, based on detecting glare in the recorded data, that the blade is abnormal; and based on the determining that the blade is abnormal, providing a blade abnormality notification.

18. The method of claim 1, wherein said determining comprises:

extracting, from the sensor data, a rise time of a brightness of the at least one reflection from a first value to a second value;

comparing the extracted rise time to an expected rise time; and determining that the blade is abnormal based on the extracted rise time differing from the expected rise time by more than a predefined threshold.

19. The method of claim 1, wherein said determining comprises:

extracting, from the sensor data, a fall time of a brightness value of the at least one reflection from a first value to a second value;

comparing the extracted fall time to an expected fall time; and determining that the blade is abnormal based on the extracted fall time differing from the expected fall time by more than a predefined threshold.

20. The method of claim 1, wherein said determining comprises:

extracting, from the sensor data, a peak brightness value of the at least one reflection;

comparing the extracted peak brightness value to an expected peak brightness value; and determining that the blade is abnormal based on the extracted peak brightness value differing from the expected peak brightness value by more than a predefined threshold.

21. The method of claim 1, wherein said determining comprises:

extracting, from the sensor data, a sharpness of a peak of a peak brightness value of the at least one reflection;

comparing the extracted sharpness to an expected sharpness; and determining that the blade is abnormal based on the extracted sharpness differing from the expected sharpness by more than a predefined threshold.

22. The method of claim 1, wherein said determining comprises:

extracting, from the sensor data, an average brightness of a peak of a peak brightness value of the at least one reflection;

comparing the extracted average brightness to an expected average sharpness; and determining that the blade is abnormal based on the extracted average brightness differing from the expected average brightness by more than a predefined threshold.

23. A gas turbine engine, comprising:

a light source configured to project light into an illumination area;

a hub and a plurality of blades that extend radially outward from the hub and are configured to rotate about a longitudinal axis through the illumination area;

at least one cylindrical lens disposed between the light source and the illumination area, wherein the light source is configured to project the light into the illumination area through the at least one cylindrical lens, and wherein the at least one cylindrical lens is configured to arrange the projected light into in a generally planar light sheet in the illumination area that forms a line or curve on a surface of said one of the plurality of blades;

a sensor configured to record data of at least one reflection of the projected light from one of the plurality of blades disposed in the illumination area; and processing circuitry configured to:

determine, based on detecting glare in the recorded data, that the blade is abnormal; and based on the determination that the blade is abnormal, provide a blade abnormality notification.

24. The gas turbine engine of claim 10, wherein to determine whether the blade is abnormal, the processing circuitry is configured to:

extract, from the sensor data, a rise time of a brightness of the at least one reflection from a first value to a second value;

compare the extracted rise time to an expected rise time; and determine that the blade is abnormal based on the extracted rise time differing from the expected rise time by more than a predefined threshold.

25. The gas turbine engine of claim 10, wherein to determine whether the blade is abnormal, the processing circuitry is configured to:

extract, from the sensor data, a fall time of a brightness value of the at least one reflection from a first value to a second value;

compare the extracted fall time to an expected fall time; and determine that the blade is abnormal based on the extracted fall time differing from the expected fall time by more than a predefined threshold.

26. The gas turbine engine of claim 10, wherein to determine whether the blade is abnormal, the processing circuitry is configured to:

extract, from the sensor data, a peak brightness value of the at least one reflection;

compare the extracted peak brightness value to an expected peak brightness value; and determine that the blade is abnormal based on the extracted peak brightness value differing from the expected peak brightness value by more than a predefined threshold.

27. The gas turbine engine of claim 10, wherein to determine whether the blade is abnormal, the processing circuitry is configured to:

extract, from the sensor data, a sharpness of a peak of a peak brightness value of the at least one reflection;

compare the extracted sharpness to an expected sharpness; and determine that the blade is abnormal based on the extracted sharpness differing from the expected sharpness by more than a predefined threshold.

28. The gas turbine engine of claim 10, wherein said determining comprises:

extract, from the sensor data, an average brightness of a peak of a peak brightness value of the at least one reflection;

compare the extracted average brightness to an expected average sharpness; and determine that the blade is abnormal based on the extracted average brightness differing from the expected average brightness by more than a predefined threshold.

* * * * *